UNITED STATES PATENT OFFICE.

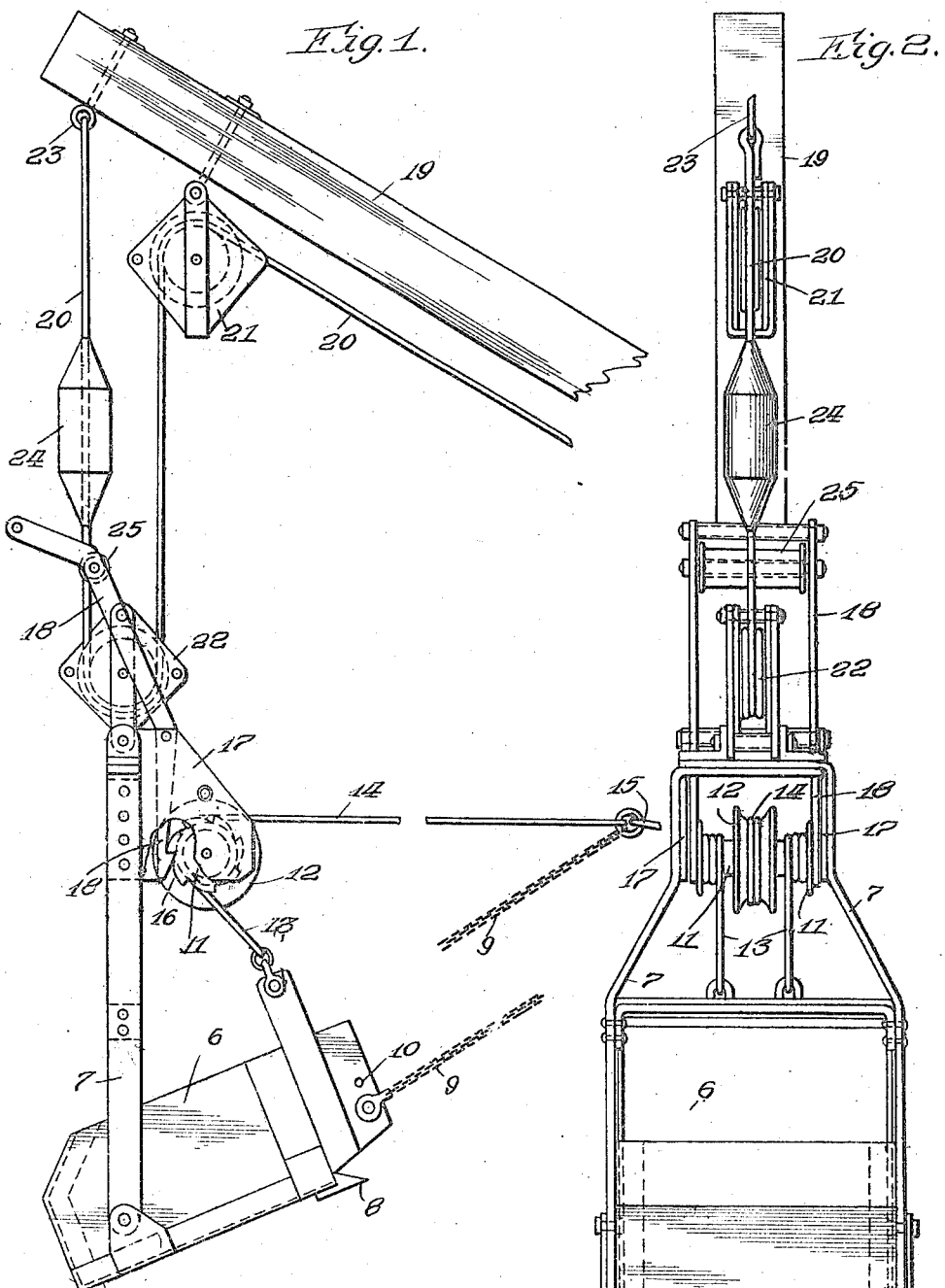

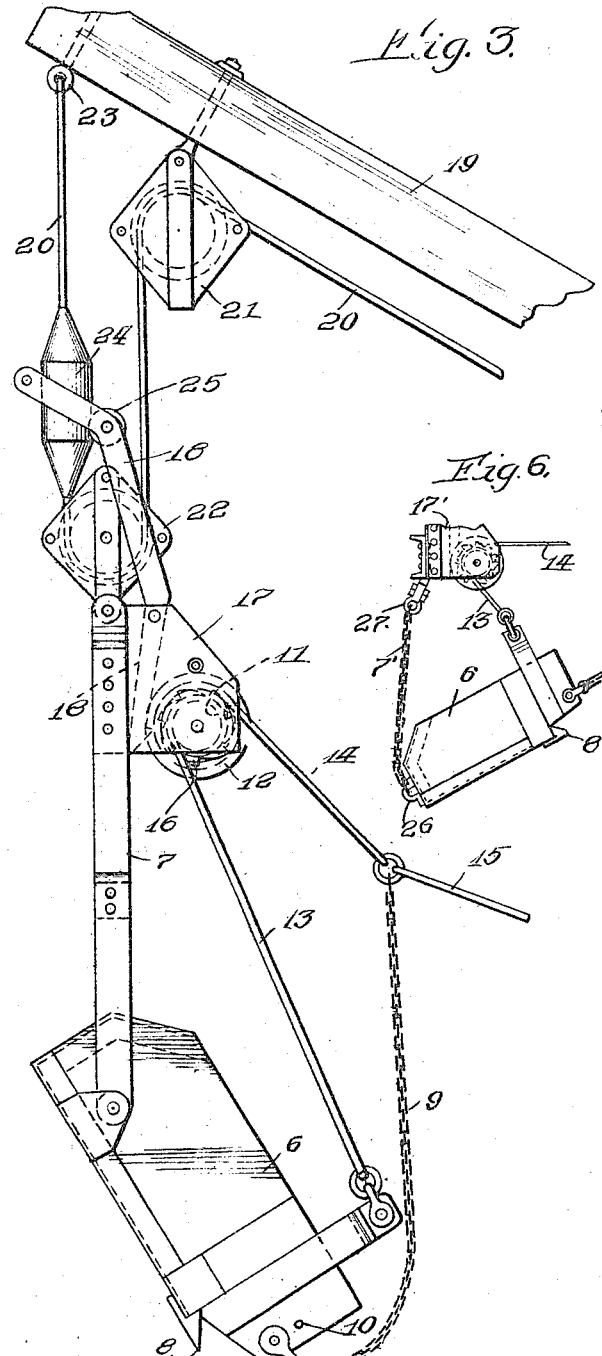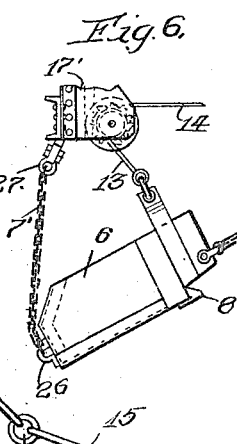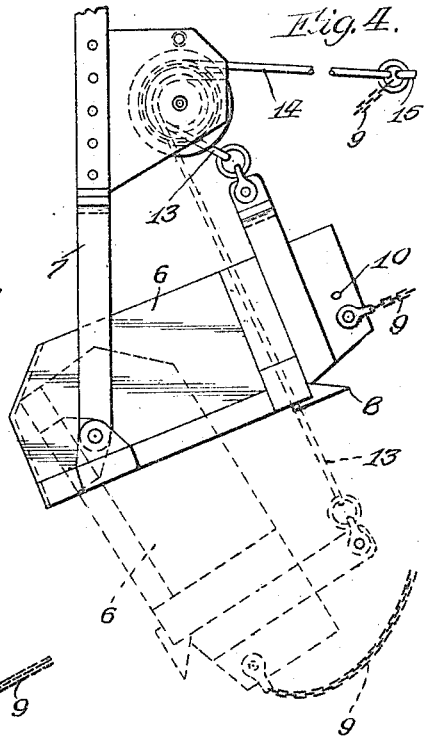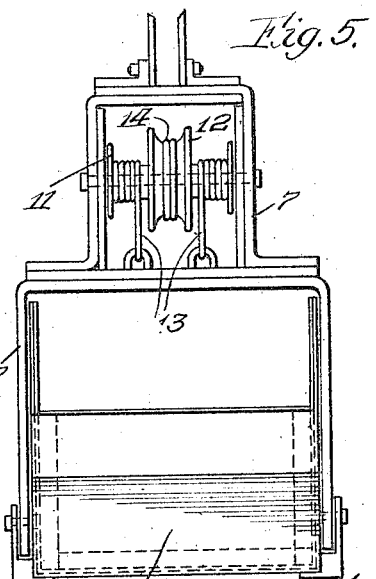

HENRY B. SAUERMAN, OF CHICAGO, ILLINOIS.

EXCAVATING-SHOVEL.

1,268,161.  Specification of Letters Patent.  Patented June 4, 1918.

Application filed April 15, 1915. Serial No. 21,493.

*To all whom it may concern:*

Be it known that I, HENRY B. SAUERMAN, a citizen of the United States, residing at Chicago, in the county of Cook and State of Illinois, have invented certain new and useful Improvements in Excavating - Shovels, of which the following is a specification.

This invention relates to improvements in excavating shovels, and the principal object of the invention is to provide a new and improved construction by which the swinging motion of the shovel, while being moved, is reduced to a minimum, and in which the movement of the main hauling rope is not given directly to the front of the shovel in raising it.

Other objects will appear hereinafter.

In the drawings:—

Figure 1 is a side elevation of an excavating device constructed in accordance with the principles of my invention, Fig. 2 is a view in elevation of the same, Fig. 3 is a view of the shovel in dumping position, Fig. 4 is a view of a modified form which omits the drum-locking mechanism;

Fig. 5 is a rear elevation of the shovel in Fig. 4; and Fig. 6 shows a shovel with a flexible supporting bail.

If the rope which raises the front of the shovel is connected directly by means of a pulley to the main hauling rope, the movement of the main hauling rope causes a corresponding movement of the front of the shovel. This is obvious in a suspended type of shovel, for the reason that if the hauling rope gets to swinging, the movement is communicated directly to the front of the shovel, and as more or less swinging is bound to be present whenever the shovel is moved from one place to the other, or hauled in by the rope, it is difficult to keep the front of the shovel from inclining downwardly and thereby losing some of its contents. By placing a differential drum between the main hauling rope and the rope attached to the front of the shovel, this swinging movement is reduced to a minimum and by including a latch in connection with the drum, the front of the shovel can be raised to any desired height and held at that height without danger of the front of the shovel inclining downwardly, even if the hauling rope does become slack.

In the present invention, the numeral 6 designates generally a shovel which is pivoted to a supporting bail 7 at a point behind the center of gravity of the shovel. The shovel is formed with a forward cutting edge 8 and attached to the sides of the front of the shovel above the cutting edge, is a rope 9 for exerting a substantially horizontal pull on the shovel. One or more holes 10 may be provided along the front of the shovel for changing the point of application of the horizontal pulling rope 9.

The bail 7 is preferably narrowed at a suitable distance above the shovel and has pivoted thereto drums 11 and 12 which are secured together, and which, for convenience, may be termed a differential drum. Secured to the front of the shovel are one or more ropes 13 which are adapted to be wound upon and are secured to the drum 11 of smaller diameter. Secured to the larger drum 12 is a rope 14 the rotation of which causes a corresponding but reduced movement of the rope 13.

Both of the ropes 9 and 14 are secured to a main hauling rope 15, their relation being such that when the shovel is in the position shown by Fig. 3, in which it is just about to be lowered into the material to be excavated, the first action of the main hauling rope will be to unwind the rope 14 from its drum 12 which will wind the rope 13 upon the drum 11 causing the shovel to be raised to the position shown in Fig. 1. At this time the slack will be taken out of the rope 9 and the continued pulling on the rope 15 will cause the hauling movement of the shovel 6. From this it will be obvious that any movement which is given the rope 14 is reduced by the differential drum before it is transmitted to the shovel through the rope 13, and therefore any swinging movement that the rope 14 may have, will not be given directly to the front of the shovel.

Secured to the differential drum is a toothed ratchet wheel 16, and pivoted to the bail 7 or a bracket 17 thereof, is a pawl 18 which has a weighted end tending to keep the pawl in engagement with the ratchet wheel. When the front of the shovel 6 is raised, under ordinary conditions, it is held against downward movement by the operation of the pawl and ratchet wheel.

This type of excavating shovel is frequently used in connection with an excavator boom 19 and the shovel is raised and lowered by means of a rope or cable 20 which passes over a pulley 21 secured to the boom and another pulley 22 secured to the bail 7. The outer end of the rope 20 is usually secured to an eye-bolt 23 at the end of the boom.

In order to release the pawl and ratchet device, the rope 20 is provided with a projection 24 and the pawl carries a roller 25 which normally is in contact with the rope 20, but which, when the supporting bail 7 and the shovel 6 are raised sufficiently by the rope 20, will engage the projection 24, causing the pawl to be withdrawn from contact with the ratchet wheel 16, thereby permitting the differential drum to be operated in either direction for raising or lowering the front of the shovel.

In the form shown by Figs. 4 and 5, the construction is the same as in the other figures with the exception that the pawl and ratchet are omitted; the ropes 13 and 14 are wound about a differential drum, and in the absence of the pawl and ratchet, the hauling rope 15 must maintain a continuous tension on one or the other of the ropes 13 and 14 in order that the shovel will be properly held in performing its work. If the hauling rope is slackened, the shovel will assume the dotted line position shown in Fig. 4, thus discharging its contents.

Although the word "rope" is used throughout the specification and claims, it is used in the sense of any suitable flexible member, such as a fibrous cord or rope, a chain, or a wire rope or cable.

It is contemplated furthermore, that instead of the rigid bail 7 a flexible bail or support 7', as shown by Fig. 6, may be employed in connection with the shovel 6 to which it is connected by means of one or more brackets 26 at the rear of the shovel and supported by a fastening 27 on the support 17'. The brackets 26 being at the rear of the shovel offer no resistance to its forward movement, as they would if at the side.

What I claim is:

1. In apparatus of the class described, the combination with a support flexibly mounted for vertical reciprocation; a shovel pivoted at one end to the support; means attached to the other end for positively raising it, comprising a differential drum; and latching means comprising a holding lever for the drum engaging by raising the support to disengage the shovel.

2. In apparatus of the class described, the combination with a support, of a ratchet drum having portions of two diameters pivoted therein, a shovel hinged at one end in said support, flexible means secured to the other end of the shovel and wound upon the drum, other flexible means to rotate the drum in raising the end of the shovel, means to vertically elevate the support, and latching means for engaging the drum ratchet which is automatically disengaged to release the raised end of the shovel when the support is raised a predetermined amount.

3. In apparatus of the class described, the combination with a suspended support, of a shovel hinged at the rear from said support, a drum having portions of two diameters rotatable in said support, flexible means attached to the front of the shovel and to said drum, one portion extending from the shovel and around the drum portion of smaller diameter, and another divided and attached to the shovel and wound about the drum portion of larger diameter so that the front of the shovel will be raised when it is pulled, means for holding the drum in raising the front of the shovel, and means for disengaging said holding means when the support is vertically raised to a predetermined position, thus dumping the shovel if the divided portion of said flexible means is slack.

4. In apparatus of the class described, the combination with a vertically raisable support, of a shovel hinged therein for dumping, a differential drum rotatable in said support, flexible means attached to said drum and shovel to slowly and positively right the shovel and draw it laterally when the means is pulled, and means for holding the drum as the shovel is raised and until the support is bodily raised a predetermined amount whereupon the drum is disengaged.

In testimony whereof I have signed my name to this specification, in the presence of two subscribing witnesses, on this 13th day of April, A. D. 1915.

HENRY B. SAUERMAN.

Witnesses:
 KENT W. WONNELL,
 ALLENA OFFUTT.